United States Patent [19]

Bachelard et al.

[11] 4,377,566

[45] Mar. 22, 1983

[54] NOVEL PROCESS FOR THE PREPARATION OF HIGH PURITY ALUMINA FROM AMMONIUM ALUM

[75] Inventors: Roland Bachelard, Lyons; Robert Barral, St. Symphorien D'Ozon, both of France

[73] Assignee: Produits Chimiques Ugine Kuhlmann, Courbevoie, France

[21] Appl. No.: 278,977

[22] Filed: Jun. 29, 1981

[30] Foreign Application Priority Data

Jul. 1, 1980 [FR] France ................................. 80 14620

[51] Int. Cl.$^3$ ................................................ C01F 7/32
[52] U.S. Cl. .................................... 423/631; 423/625; 423/600
[58] Field of Search ................................ 423/625, 631

[56] References Cited

U.S. PATENT DOCUMENTS

| 1,957,767 | 5/1934 | Fleischer | 423/631 |
| 1,957,768 | 5/1934 | Fleischer | 423/631 |
| 2,773,741 | 12/1956 | Antonsen | 423/625 |
| 3,679,361 | 7/1972 | Bonelli et al. | 423/625 |
| 4,085,201 | 4/1978 | Griffiths | 423/625 |

OTHER PUBLICATIONS

Tertian et al., "J. de Chimie Physique", vol. 55, No. 5, 1958, pp. 341-353.

Primary Examiner—Herbert T. Carter
Attorney, Agent, or Firm—Brooks, Haidt, Haffner & Delahunty

[57] ABSTRACT

Process for preparing high purity aluminas from ammonium alum, the process comprising separately dehydrating the alum and thereafter thermally decomposing the dehydrate, wherein the thermal decomposition is carried out by forcing a gas through a layer of the dehydrated alum so as to continuously remove the gaseous reaction products formed without removal of solids by the carrier gas, and providing improved productivity of high purity transition aluminas having specific surfaces above 125 m$^2$/g and/or bulk densities above 0.2 g/cm$^3$, the transition aluminas so obtained being characterized by their greater reactivity for the preparation of corundum so that corundum having a bulk density greater than 0.4 g/cm$^3$ can be economically prepared.

11 Claims, 2 Drawing Figures

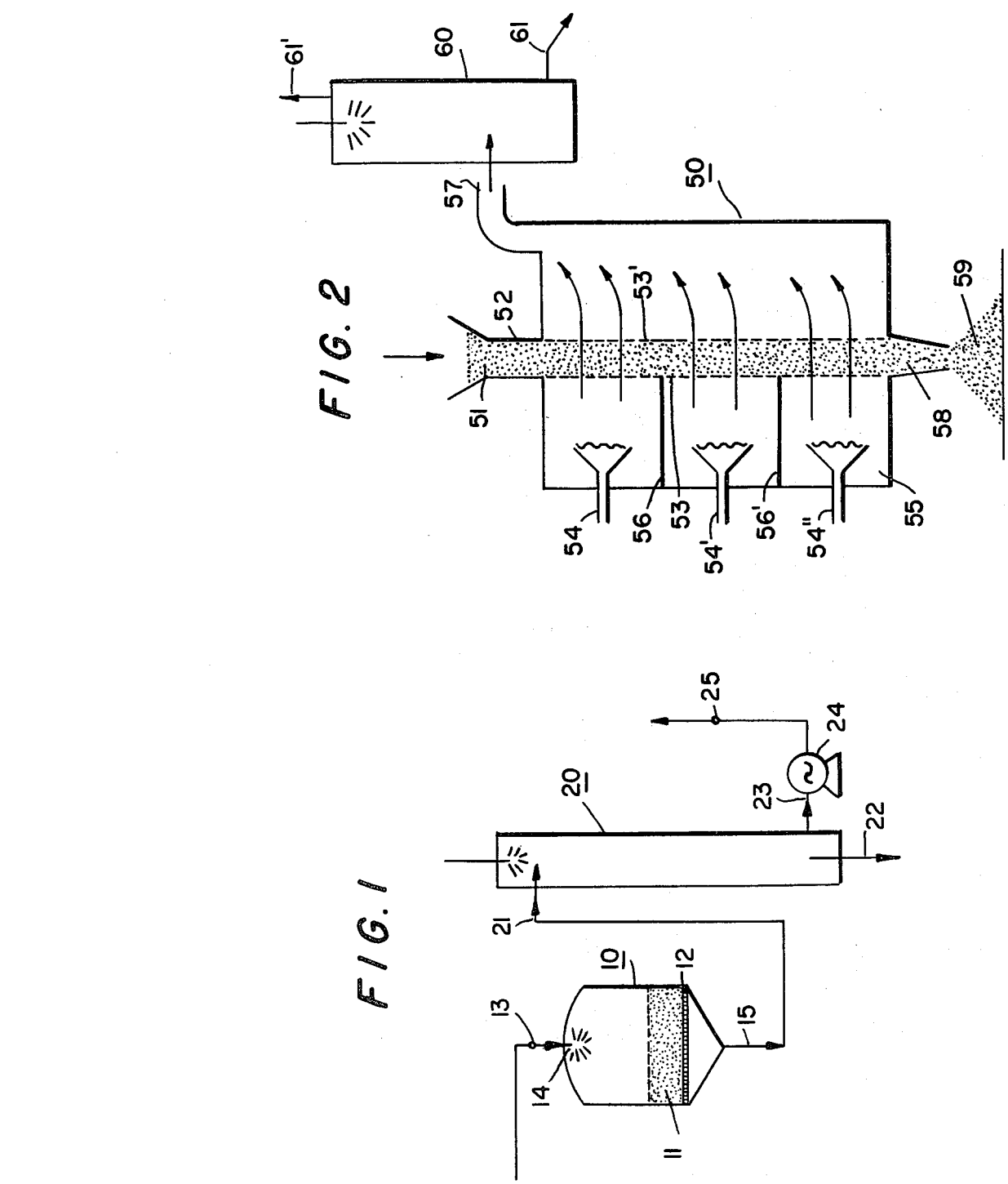

NOVEL PROCESS FOR THE PREPARATION OF HIGH PURITY ALUMINA FROM AMMONIUM ALUM

BACKGROUND OF THE INVENTION

The present invention relates to new methods permitting the preparation of high purity aluminas and the alumina products obtained thereby, and more particularly, it relates to the production of such aluminas starting with ammonium alum.

High purity aluminas are commercially prepared by the thermal decomposition of ammonium alum. The preparation of alumina starting from ammonium alum proceeds through a series of complex reactions: dehydration of the alum, thermal dissociation of the anhydrous alum leading to the aluminum sulfate, and finally, thermal decomposition of this latter.

When the alum is heated without special safeguards, it begins by melting in its own water of crystallization. Then, the solution evaporates, which leads to its progressive thickening. When saturation is attained, the product crystallizes. In the course of this phase, some of the vapors are entrapped in the solid which is formed. This promotes a considerable expansion in volume which ultimately results in the formation of an extremely porous and light mass which has the appearance of a meringue. The anhydrous alum then decomposes by steps, but the apparent volume of the solid is not seen to change greatly.

Ordinarily, the alum is placed in crucibles, generally of silica, in which all of these steps are sequentially carried out. The thermal treatment is effected either in intermittent furnaces or in continuous circulation furnaces of the type used for firing ceramic articles. However, the decomposition velocity of the aluminum sulfate is slow under these conditions. It eventuates that a prolonged residence time is necessary to conduct the preparation to its end. For all these reasons, the furnace productivity is extremely small and the equipment for a given production capacity entails substantial expense.

A few other solutions have been proposed in the prior art. British Pat. 514,538 describes a process in which the starting material is atomized in a first stage of thermal treatment in the form of a solution, a suspension, or a molten bath containing water, through a calcination column by means of air or steam and in which the anhydrous salts formed are then passed, in a second stage of thermal treatment, in that case after comminuting, (in suspension) in a current of hot gases at high temperature in a decomposition chamber. Such a process is very costly and of long duration, and thus hardly invites use on a commercial scale.

It is also known from German patent application 2,215,594 to inject alums containing the water, by means of compressed air, directly into a burner flame having a temperature of 1200° to 1600° C. and thermally decomposing some of these in such fashion. Nevertheless, this process also itself is commercially costly, and it moreover presents the inconvenience of being very subject to unstable operation.

According to West German Pat. No. 2,419,544, alum in powdered form is heated by means of hot gases and the powder is compacted into brick form prior to its entry into the second stage of thermal treatment. These prior art processes present multiple difficulties: the residence times are very long or it is difficult to control large-scale apparatus, which necessitates consequent low production; the product is frequently contaminated in the course of the treatment; instabilities in the desired operating conditions are frequent; and it is sometimes even recommended that recourse to a separate briquetting operation is necessary.

The γ- and η-aluminas, also called "transition aluminas", obtained starting from ammonium alum by the commercial prior art processes have the following characteristics:

Residual sulfur, about 0.2 percent
Specific surface, less than 125 m$^2$/g
Loose or bulk density ($d_{app}$), about 0.15 g/cm$^3$ The α-alumina, or corundum, obtained by calcination of these transition aluminas has a bulk density not exceeding 0.2 g/cm$^3$.

The γ- and η-aluminas (transition aluminas) have numerous commercial uses. Notable uses are as catalyst supports, starting materials for single-crystal manufacture, as fillers for plastic materials, for metal polishing, and in obtaining porous membranes. The transition aluminas also find a commercial utility as the starting material for producing α-alumina, or corundum.

For certain applications, as for example in catalysts, it is desirable to have transition aluminas with a higher specific surface, that is to say, equal to or greater than about 200 m$^2$/g.

For other uses, for example the preparation of corundum, it is desirable to have transition aluminas with a higher bulk density than those aluminas prepared from ammonium alum according to the industrial processes of the prior art, which prior art materials have densities of about 0.15 g/cm$^3$. Corundum is utilized notably for the manufacture of high pressure sodium vapor lamp tubes, the preparation of aluminates in manufacturing phosphors, the fabrication of cutting tools for metalworking, and the fabrication of bioceramics.

For most of these applications, the α-alumina ought to be formed by a compression before sintering. In these cases, if the piece ought to have well-defined dimensions, it is desirable that the shrinkage on sintering be the smallest possible. Such shrinkage is in the same proportion smaller as the density of the raw alumina is higher.

The prior art commercial processes have not permitted the manufacture of high purity α-alumina, that is to say, derived from ammonium alum, having a bulk density greater than 0.2 g/cm$^3$. But, for the very wide diversity of uses of these aluminas, correspondingly there is a great variety of considerations concerning their physico-chemical properties of density, specific surface, corundum content, and so on.

There accordingly exists a need to develop industrially useful processes for preparing high purity aluminas starting from ammonium alum offering a very great flexibility, notably with regard to the possibility of producing a great variety of alumina physico-chemical characteristics.

There equally exists a commercial need to develop a process for the preparation of high purity aluminas starting from ammonium alum which will be economical and reliable.

THE INVENTION

The present invention responds to the needs for industrial use and provides processes for the preparation of high purity aluminas starting from ammonium alum. Briefly, this novel process separately effects the dehydration of the alum and then the thermal decomposition of the dehydrated alum, and is characterized by the fact that during the course of the thermal decomposition, a hot gas is forced to traverse a layer of dehydrated alum so as continuously to remove the gaseous products of the reaction, while hindering the possible movement of the solid by the gaseous carrier.

The invention will be further explained with reference to the accompanying drawings, wherein FIG. 1 is a schematic representation of an embodiment involving a fixed bed, and FIG. 2 is a schematic representation of a vertical moving bed embodiment of a continuous process.

The dehydrated alum is brought to a temperature of from about 600° to 1100° C. if it is desired to prepare a transition alumina and to a temperature above 1100° C. if it is desired to prepare, beyond the transition alumina, α-alumina.

The gas is forced to travel through the layer of dehydrated alum by positive pressure or by aspiration.

Various modes of carrying out the invention can be utilized. For example, the dehydrated alum is placed on a porous support and the gas is forced to pass through it from top to bottom. Alternatively, the dehydrated alum is sandwiched between two porous or permeable supports and the gas is forced to traverse the alum laterally or from bottom to top.

The process of this invention can be practiced discontinuously or batch-wise, and in this case the alum layer is immobile. Alternatively, the process of this invention can be practiced continuously, and in this case the alum layer is then brought into a flowing motion at a controlled speed along the reactor walls.

According to a preferred mode of practicing this invention, the necessary heat energy for transformation of the dehydrated alum to alumina is carried by the gas. The gas forced to pass through the dehydrated alum layer can be any gas inert to the reaction and, in certain embodiments, can be air or combustion gas.

The dehydration of the alum can be effected in various ways, some of which are already known. For example, the alum which melts in its own water or crystallization can be heated and evaporated. This method produces a very porous and light alum which has the appearance of a meringue. This product can thereafter be broken up and indeed even ground, nevertheless without its bulk density exceeding 0.6. The aluminas obtained according to the present invention from such a starting alum have a low bulk density, of the order of 0.15 g/cm$^3$.

According to another embodiment of the invention, the dehydrated alum from the operating procedure described above is then compacted, made into pellets or granules to form a bed having much greater porosity and a high packed density. In yet another embodiment of the invention, the dehydration of the ammonium alum is accomplished in a fluidized bed with a dry gas brought to a temperature above the alum fusion temperature.

In a preferred embodiment of the invention, dehydration of the raw ammonium alum is effected by novel means discovered in connection with the invention. The alum is heated under vacuum or by utilizing a current of dry gas and maintaining the partial pressure of the water vapor at a reduced value. There exists a correlation between the temperature of the alum during the course of its dehydration and the partial pressure of water vapor, and this can readily be determined by one skilled in the part in view of the present disclosure.

For this dehydration, one can use a heating medium having a temperature above the fusion point of the alum without the alum melting. It suffices in effect that the speed of evaporation is adequate. The heat-carrying medium can for example be an oil or superheated steam or other gas.

The absence of an expanded volume of dehydrated alum results in the bulk density of the product having a higher value which can reach 1 g/cm$^3$. Because of this fact, such dehydrated alum advantageously fills the reactor while forming a layer of great permeability. This advantage, due to good loading of the reactor, is maintained in the present process because, in working according to this invention, the decomposition velocity of such a product is in a surprising manner as high as that of the "expanded" dehydrated alum.

The increase of productivity in the process of the invention is found to result when the dehydrated alum according to this preferred mode of practice is used as the starting material. Moreover, the alumina so obtained exhibits a better flowability and its handling is more satisfactory because it is less dusty; its bulkiness is reduced due to its greater density than that of the powder. It can, moreover, be noted that grinding being easy, the production of a powdery product does not present any difficulty when this is desired.

In certain cases, in order to provide particular properties to the alumina, specific additives are combined with the starting alumina. These are for example some metal oxides which provide color to the monocrystal, magnesia introduced in the form of salts (the double sulfate of magnesium and ammonium or the acetate) which leads to the formation of spinels, $Al_2O_3 \cdot MgO$, showing a good resistance to crystal growth, or other oxides such as yttrium oxides, which modify the physical properties of the alumina. The alumina component remains, however, greatly preponderant in all these compositions of the invention, which has as its object the preparation of aluminas, and applies equally to this entire family of products.

FIG. 1 shows an embodiment of the invention in which the dehydrated alum is placed on a porous support and the gas is forced to move therethrough from top to bottom. According to the embodiment illustrated in FIG. 1, dehydrated alum 11 is charged to reactor 10, which is for example a refractory lined furnace, the dehydrated alum being placed on porous support 12. Gases enter furnace 10 through conduit 13 and are heated and forced to travel through layer 11 by means of burner 14. The gases leaving reactor 10 through conduit 15 enter absorption column 20 through communicating conduit 21, where they are treated to remove the decomposition products. The decomposition products are removed from absorption column 20 through conduit 22. The remaining gases leave column 20 through line 23 with the assistance of blower 24 which exhausts through conduit 25.

FIG. 2 shows an embodiment involving a continuous process in a vertical moving bed reactor wherein the dehydrated alum is disposed between two porous walls and is swept transversely by the hot gas.

According to the embodiment practiced as illustrated in FIG. 2, dehydrated alum 51 is fed through channel 52 into calcination apparatus 50 continuously working on a down-flow bed. This calcination apparatus comprises two equidistant porous partitions 53 and 53', between which flows dehydrated alum 51. This flowing bed of dehydrated alum is transversely crossed by a strong current of hot gases from burners 54, 54' and 54" situated at different levels behind porous partition 53 within enclosure 55. Tight bulkheads 56 and 56' separate the gases which have different temperatures that increase towards the bottom. In crossing the layer of particles 51', the heated gases entrain the gaseous decomposition products without being able to entrain the solids which are transversely immobilized between the two porous partitions 53 and 53'. The effluent gases escape through the second porous partition 53' and are collected in flue 57 to be neutralized in apparatus 60 and withdrawn through lines 61 and 61'.

The solid is successively decomposed and then converted to alumina which continuously exits through line 58, at the bottom of apparatus 50, in the form of granules 59.

In working according to the process of the present invention, the heat exchange is improved for providing the necessary calories to the decomposition of the sulfates, and the mass exchange is also improved. Because of this, productivity increases.

The process of the present invention provides multiple advantages. While achieving improved productivity, they permit the commercial preparation of high purity transition aluminas, containing less than 0.15% residual sulfur, which are able to have increased specific surface areas which are above 125 m$^2$/g and/or higher bulk density, above 0.2 g/cm$^3$.

Another very important advantage of the invention resides in the fact that the transition aluminas prepared according to the present processes are very reactive in the conversion to corundum. By way of example, when it was necessary to calcine transition aluminas according to prior art techniques for two or three hours to obtain some corundum, it suffices to calcine transition alumina obtained according to the present invention for 15 minutes to obtain the same result. The process of the present invention permits the economical production of corundum having a bulk specific weight greater than 0.4 g/cm$^3$, whereas the corundum obtained by commercial prior art techniques had a bulk specific weight on the order of 0.2 g/cm$^3$. Moreover, according to this invention, it is possible to convert dehydrated alum to corundum without discharge from the apparatus, whereas in commercial prior art installations, two passes were necessary.

A supplemental advantage of the present process resides in the possibility of obtaining alumina having variable physico-chemical characteristics, these latter essentially being determined by the thermal treatment parameters. For example, increasing the calcination temperature brings with it a diminution of the specific surface of the alumina, all other conditions being equal.

It will be appreciated from the present description that the process of the present invention accordingly brings together increased productivity and the possibility for the preparation of aluminas having novel properties.

The following Examples are given to illustrate embodiments of the invention as it is presently preferred to practice it. It will be understood that these Examples are illustrative, and the invention is not to be considered as restricted thereto except as indicated in the appended Claims.

EXAMPLE I

In the first place, one proceeds to dehydrate ammonium alum. For this, some crystals of alum are placed in a rotating flask connected to a vaned pump. When the residual pressure in the enclosure reaches 0.1 mm Hg, the apparatus is placed in rotation and then immersed in an oil bath heated to 100° C. After 30 minutes the temperature of the oil bath is progressively brought to 150° C. At this stage, the heating is continued for eight hours. During this treatment, the water leaving the alum is condensed in a receiving flask immersed in ice.

At the end of this treatment, the alum has lost about 45 percent of its original mass and x-ray diffraction shows the spectrum of dehydrated alum. The particles have kept their crystal habit and comprise a powder, the packed density of which is about 0.65 kg/dm$^3$.

The thermal decomposition is then carried out. To this end, the product is taken up to be placed in the form of a layer, with a thickness of about 7 cm, on a porous ceramic plate, the same being placed in the cross section of a cylindrical Inconel reactor.

A heating coil surrounds the reactor and serves also to preheat the filtered air which is introduced into the apparatus above the bed of dehydrated alum. The rate of air fed is about 1.4 Nm$^3$/hr-dm$^2$ of reactor cross section. A thermocouple placed in the product permits programming the thermal treatment. This latter permits a rapid increase to 925° C., followed by maintenance at this temperature for three hours.

As soon as the temperature of the product goes beyond 400° C., there is an emission of white fumes which are entrained by the carrier gas and which condense on the wall of a vertical glass tubular exchanger. The non-condensed gaseous portions are removed through a vent hole. When the temperature reaches its maximum level, the solid concretions left in the condenser are transformed to viscous products which fall into a receiving flask where they are gathered at the end of the operation to be neutralized and then discarded.

During the entire duration of the treatment, the pressure drop does not exceed 40 g/cm$^2$. At the end of this calcination, the product is recovered after cooling by aspiration. The product is in the form of a white granular powder, the particles of which still have their original morphology. The bulk density of the product is about 0.35. Its specific surface area is about 195 m$^2$/g. It is comprised of a variety of transition aluminas having excellent purity. In effect, the quantity of residual sulfur is less than 0.1 percent.

In order to assay the reactivity of this product in connection with its transformation to corundum, a sample is subjected to a calcination test under the following conditions:

| Temperature | 1200° C. |
| Time | 30 min. |
| Atmosphere | Ambient Air |

At the end of this treatment, the BET specific surface area is measured and the corundum formed is determined by x-ray diffraction. By way of comparison, the same analysis is carried out on a commercially made alumina from alum according to the foregoing technique, and this commercial alumina is characterized by a BET specific surface area of 100 m$^2$/g and by a bulk density of 0.15. The following results are obtained:

|  | Prior Art Alumina | Alumina of Example I |
| --- | --- | --- |
| Starting Material (Transition alumina) | | |
| Appearance | Powder | Particles |
| Bulk density, g/cm$^3$ | 0.15 | 0.35 |
| BET surface, m$^2$/g | 100 | 195 |
| Residual sulfur, % | 0.2 | <0.1 |
| After Calcination at 1200° C. for 30 min. | | |
| BET surface, m$^2$/g | 48 | 8.4 |
| α-Al$_2$O$_3$, % | 49 | 92 |

The novel process of the present invention involving calcination in a down-flow bed thus affords aluminas with increased specific surface areas and exhibiting a greatly increased reactivity with respect to the formation of corundum.

EXAMPLE II

A charge of alum is treated in a microwave oven with a magnetron working at a frequency of 2450 MHz. The apparatus is provided with a turntable on which the vessels holding the alum crystals are placed.

Under these conditions, the product melts and then dehydrates giving rise to a great expansion in volume, denominated under the term "meringue". The meringue of dehydrated alum is recovered to be ground and passed through a sieve with a 420 micron mesh. There is thus obtained a powder having a packed density of about 0.34.

This product is charged to the Inconel reactor described in Example I in the form of a layer with a 7 cm thickness. A current of dry air is forced at the rate of 1050 L/hr-dm$^2$ to pass through the bed thus established, this causing a weight loss not surpassing 30 g/cm$^2$.

The temperature of the product is rapidly brought to 975° C. where it is kept for five hours. During decomposition of the alum, the pressure drop commences to rise and attains a maximum of 90 g/cm$^2$. Then it diminishes until at the end of the test it stabilizes at 10 g/cm$^2$.

After removal the recovered η-alumina is pulverulent with a bulk density of 0.16 kg/dm$^3$ and a BET specific surface of 156 m$^2$/g.

EXAMPLE III

Some ammonium alum is melted in a glass apparatus to obviate contamination which could result from contact with a metal vessel. It is then dehydrated by atomizing it into a stream of hot air. The dehydration equipment is also constructed of glass. In this manner, a very broken up dehydrated alum having a packed density of 0.10 is obtained.

The Inconel reactor of the preceding Examples is charged with this product so as to provide a layer 7.5 cm in thickness. The decomposition is carried out under the conditions used above, with an air flow of 1059 L/hr-dm$^2$.

The maximum temperature used is 950° C. and this is maintained for only two hours and 30 minutes. In spite of this short treatment at a relatively low temperature, the product recovered comprises η-alumina which does not contain more than 0.17 percent residual sulfur. The specific surface of this powder is about 169.3 m$^2$/g. One particular characteristic of this alumina is conferred by the spray drying of the alum. In effect, this process leads to the production of very light powders, as the packed density of this alumina does not exceed 0.065 kg/dm$^3$.

EXAMPLE IV

Some crystals of ammonium alum having an equivalent diameter on the order of one millimeter are placed in a rotary, biconical enamelled steel reactor. This apparatus is fitted with a double wall within which a heating fluid can be circulated. However, it is provided with a liquid piston type rotary blower capable of drawing a vacuum in the enclosure.

When the residual pressure reaches 30 mm Hg, a stream of hot water is admitted to the jacket. At the beginning, the product is brought to 85° C. and this temperature is maintained for six hours. This first treatment provides for the elimination of about 75 percent of the alum's water of crystallization.

The temperature is thereafter progressively increased by superheating the water with steam injection so as to bring the charge to about 130° C. After a total treatment duration of 24 hours, a practically dehydrated product is recovered with a packed density in the range of 0.6 kg/dm$^3$. This product shows particles pseudomorphic to the starting alum.

To achieve decomposition of the alum, a brick-lined vertical cylindrical reactor is used with its interior fitted with a horizontal supporting grill of ceramic material, pierced with numerous orifices. This grill is covered with a layer of several centimeters of alumina spheres with a diameter of 5-6 mm, the purpose of which is to hold the alum particles and avoid direct contact between these and materials likely to contaminate the alum.

The heating of the apparatus is by burning propane in a level flame burner placed in the upper part of the reactor in the cap. This reactor proper and its cap are connected in gas-tight fashion by a cooled joint. This construction permits obtaining an over pressure above the bed of alum and forces the combustion gas to pass through the bed.

After having passed out of the alum bed, the gas carries the decomposition products into the top of an absorption column where they are at first quenched by water sprays, then washed with a dilute soda solution streaming on the lining. Finally, the gases are discharged to the atmosphere with the aid of a blower.

This apparatus is charged with the alum dehydrated as above so as to form a bed of uniform thickness on the alumina spheres. The charge is 400 g of alum per square decimeter of cross-section.

The flow of air admitted to the burner is constant and equal to 1.3 Nm$^3$/hr-dm$^2$ of cross-section. A predetermined program regulates the propane flow as a function of the desired temperature profile.

In the present case, the charge is at first brought to 840° C., maintained at this temperature for one hour, then the heat is increased to reach 970° C., which level is maintained for two hours. At the end of this period of treatment, the burner is stopped, but the air flow is continued to speed the cooling.

The cap is then removed to permit access to the charge, which is recovered practically without loss by suction.

In this instance, the productivity is about 85 g of alumina per square decimeter of cross section of the reactor, and in actual operation would be about 15 g Al$_2$O$_3$/hr-dm$^2$. Thus, an apparatus having a usable cross-section of 400 square decimeters (a diameter of 2.25 m) produces under these circumstances about 50 tonnes/year in continuous operation.

The product obtained is η-alumina having a specific surface of 145 m²/g. The amount of residual sulfur does not exceed 0.15%. The bulk density of the granular dry product is about 0.35 kg/dm². The reactivity of this alumina judged by its conversion to corundum is tested according to the procedures described in Example I.

After calcination of 1200° C. for 30 minutes, the specific surface dwindles to 6.5 m²/g, for a corundum content of 93%, which testifies to a reactivity very superior to those alum-derived commercial aluminas such as shown in Example I.

EXAMPLE V

The ammonium alum is dehydrated according to the process used in the preceding Example. It is thereafter transferred to the reactor described in the preceding Example. This time the loading is 800 g of dehydrated alum per square decimeter of cross section.

The calcination is carried out under the same conditions according to a heating schedule which this time provides the following:

a rapid ascent to 970° C. before stabilization for a plateau of 45 minutes, followed in turn by an increase to 1250° C., concluded by a plateau of 3 hours 50 minutes at that temperature.

After cooling under a sweep of air, granules pseudomorphic with the alum involved are removed from the reactor. The alumina in question is of high purity (99.98 percent $Al_2O_3$) and measures 93.4 percent corundum with a specific surface of 3.6 m²/g. The amount of residual sulfur is 150 ppm. The bulk density of this product is 0.55 kg/dm³. Under these conditions, the reactor productivity almost reaches 20 g $\alpha$-$Al_2O_3$/hr-dm², which is in the neighborhood of 110 tonnes/year for an apparatus of three-meter diameter working without interruption.

EXAMPLE VI

Some ammonium alum crystals having particle sizes from 500 microns to 2.5 mm are introduced into a three-stage fluidized bed. The material enters the first stage at ambient temperature. It is fluidized by dry air entering at 105° C. at a velocity of 1.4 m/sec. The volume of this first chamber is such that the material resides for one hour.

Thereafter this material passes into the second stage fed under these same conditions with air heated to 130° C., and resides for a further hour. Finally, it reaches the last stage wherein the fluidization is accomplished by air at 180° C. At the end of one hour mean residence time, granules isomorphic with the starting alum are recovered, and about 95 percent of the water of crystallization has been removed.

This product serves to feed the reactor described in Example IV. According to the thermal treatment schedule adopted, the results are those obtained in Examples IV or V.

What is claimed is:

1. A process for the preparation of alumina from ammonium alum comprising first dehydrating ammonium alum at a temperature above the fusion point of the alum and below the temperature which calcines the alum to alumina and then thermally decomposing the dehydrated alum with hot gas to produce alumina, the thermal decomposition being carried out with a flow of the hot gas forced through a layer of the dehydrated alum to heat and decompose the dehydrated alum and to continuously remove the decomposition products as they are formed, the movement of the dehydrated solid alum along with the gas flow being prevented.

2. A process according to claim 1 wherein the dehydration is carried out under vacuum with the alum in contact with a surface heated to a temperature above the melting point of the ammonium alum.

3. A process according to claim 1 wherein the dehydration is carried out by fluidizing the alum with the gas heated to a temperature above the melting point of the alum.

4. A process according to claim 1 wherein the thermal decomposition is carried out in a fixed bed having the alum distributed in a substantially uniform layer and wherein the hot gas moves downwardly through the bed at a speed greater than the fluidization velocity of the charge.

5. A process according to claim 1 wherein the thermal decomposition is carried out by conducting the dehydrated alum downwardly through a conduit having gas permeable walls and sweeping the hot gas through the walls transversely to the downward movement of the dehydrated alum.

6. A process according to claim 5 wherein the dehydration of the alum is continuously effected by conducting the ammonium alum starting material downwardly through the conduit having porous walls and sweeping hot gas transversely to the downward movement of the alum, the gas being at a temperature to dehydrate the alum but lower than the temperature required to calcine the alum to alumina.

7. A process according to claim 1 wherein the dehydration is effected by heating the ammonium alum with microwave radiation to a temperature above the fusion point of the alum.

8. A process according to claim 1 wherein the thermal decomposition produces transition alumina and the transition alumina is thereafter heated to a temperature above the thermal decomposition temperature of the transition alumina to produce $\alpha$-alumina.

9. A process according to claim 1 wherein the thermal decomposition is carried out at a temperature of at least 600° C.

10. A process according to claim 1 wherein the thermal decomposition is carried out at a temperature of from 600° to 1250° C.

11. A process according to claim 10 wherein the temperature is at least about 1100° C.

* * * * *